US012776513B2

(12) United States Patent
Sekiguchi

(10) Patent No.: US 12,776,513 B2

(45) Date of Patent: Oct. 27, 2026

(54) ALL SOLID BATTERY AND MANUFACTURING METHOD OF THE SAME

(71) Applicant: TAIYO YUDEN CO., LTD., Tokyo (JP)

(72) Inventor: Masashi Sekiguchi, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 716 days.

(21) Appl. No.: 18/250,335

(22) PCT Filed: Oct. 22, 2021

(86) PCT No.: PCT/JP2021/039040

§ 371 (c)(1),
(2) Date: Apr. 24, 2023

(87) PCT Pub. No.: WO2022/118561

PCT Pub. Date: Jun. 9, 2022

(65) Prior Publication Data

US 2023/0395844 A1 Dec. 7, 2023

(30) Foreign Application Priority Data

Dec. 1, 2020 (JP) ................................ 2020-199391

(51) Int. Cl.
*H01M 10/0562* (2010.01)
*H01M 10/058* (2010.01)

(52) U.S. Cl.
CPC ..... *H01M 10/0562* (2013.01); *H01M 10/058* (2013.01); *H01M 2300/0071* (2013.01)

(58) Field of Classification Search
CPC ..... H01M 10/0562; H01M 2300/0065; H01M 2300/0068; H01M 2300/0071
See application file for complete search history.

(56) References Cited

U.S. PATENT DOCUMENTS

2013/0189562 A1* 7/2013 Dolle .................... H01M 4/139 29/623.5
2014/0017576 A1 1/2014 Kim et al. .................... 429/403
(Continued)

FOREIGN PATENT DOCUMENTS

CN 104157905 A 11/2014
CN 109075389 A 12/2018
(Continued)

OTHER PUBLICATIONS

PCT/IB/338 (Notification of Transmittal of Translation of the International Preliminary Report on Patentability) issued on Jun. 15, 2023 in the related PCT patent application No. PCT/JP2021/039040.
International Search Report dated Jan. 11, 2022 issued in PCT Application No. PCT/JP2021/039040.
(Continued)

*Primary Examiner* — Kendra Ly
(74) *Attorney, Agent, or Firm* — Stein IP, LLC

(57) ABSTRACT

An all solid battery is characterized by including a solid electrolyte layer of which a main component is an oxide-based solid electrolyte having a NASICON type crystal structure which has a compositional formula of $Li_{1+x+2y+a}A_yM'_xM''_{2-x-y}P_3O_{12+c}$, in which "A" is a divalent metal element, "M'" is a trivalent metal element, "M''" is a quadrivalent transition metal, and satisfies 0<a<1.4, a first internal electrode which is provided on a first main face of the solid electrolyte layer and includes an electrode active material, and a second internal electrode which is provided on a second main face of the solid electrolyte layer and includes an electrode active material.

7 Claims, 5 Drawing Sheets

(56) References Cited

U.S. PATENT DOCUMENTS

| | | | | |
|---|---|---|---|---|
| 2014/0057162 | A1 | 2/2014 | Schneider et al. | 429/188 |
| 2014/0080006 | A1* | 3/2014 | Ogasa | H01M 10/0525 429/322 |
| 2015/0333362 | A1 | 11/2015 | Sato et al. | H01M 10/052 |
| 2016/0141716 | A1* | 5/2016 | Ito | H01M 10/0562 429/162 |
| 2018/0115016 | A1 | 4/2018 | Ito et al. | H01M 10/0525 |
| 2018/0205112 | A1* | 7/2018 | Thomas-Alyea | H01M 10/05 |
| 2019/0006702 | A1 | 1/2019 | Yashioka et al. | H01M 10/056 |
| 2019/0273258 | A1* | 9/2019 | Thomas-Alyea | H01M 10/0585 |
| 2019/0334200 | A1 | 10/2019 | Nakajima et al. | H01M 10/0562 |
| 2020/0235384 | A1 | 7/2020 | Yoshioka et al. | H01M 4/364 |

FOREIGN PATENT DOCUMENTS

| | | | |
|---|---|---|---|
| CN | 11010165292 | A | 8/2019 |
| JP | 2014-508707 | A | 4/2014 |
| JP | 2016-001598 | A | 1/2016 |
| JP | 2018-073554 | A | 5/2018 |
| JP | 2019-085275 | A | 6/2019 |
| JP | 2020-102371 | A | 7/2020 |
| WO | WO 2018/088424 | A1 | 5/2018 |
| WO | WO 2019/093404 | A1 | 5/2019 |

OTHER PUBLICATIONS

Chinese Office Action dated Jul. 16, 2026, in corresponding application CN 202180079670.5.

* cited by examiner

ALL SOLID BATTERY AND MANUFACTURING METHOD OF THE SAME

CROSS-REFERENCE TO RELATED APPLICATIONS

This application is a national stage of International Application No. PCT/JP2021/039040, filed Oct. 22, 2021, which claims the benefit of Japanese Application No. 2020-199391, filed Dec. 1, 2020, in the Japanese Patent Office, the disclosures of which are incorporated herein by reference.

TECHNICAL FIELD

The present invention relates to an all solid battery and a manufacturing method of the all solid battery.

BACKGROUND ART

Lithium-ion secondary batteries are used in various fields such as consumer equipment, industrial machinery, and automobiles. However, a lithium ion secondary battery containing an electrolytic solution has a risk of leakage of the electrolytic solution, smoke emission, ignition, and the like. Therefore, in particular, all solid lithium-ion secondary batteries that employ oxide-based solid electrolytes that are stable in the atmosphere have been actively developed. For example, an all solid battery using a solid electrolyte containing a NASICON-type crystal structure as an oxide-based solid electrolyte has been disclosed (see, for example, Patent Documents 1 and 2).

PRIOR ART DOCUMENT

Patent Document

Patent Document 1: Japanese Patent Application Publication No. 2018-073554

Patent Document 2: Japanese Patent Application Publication No. 2016-001598

DISCLOSURE OF THE INVENTION

Problems to be Solved by the Invention

An oxide-based solid electrolyte containing a NASICON-type crystal structure is formed, for example, by a sintering process in order to obtain desired characteristics. In addition, since co-firing with the internal electrodes is required, cracks and delamination are likely to occur if there is a deviation in the sintering behavior between the members. In addition, due to the mutual diffusion reaction during the co-firing, segregation of some substance between the solid electrolyte layer and the internal electrode and imbalance in density occur. The segregation and the imbalance in density tend to occur more remarkably as the firing temperature increases. For example, if an electrode active material with an olivine-type crystal structure or an element contained in the electrode active material diffuses or segregates in the solid electrolyte layer, there is concern that the part will operate and cause a leak path. Furthermore, the formation of sparse portions due to differences in sinterability between members or reactions between members hinders the formation of ionic conduction paths at those locations and the formation of electronic conduction paths within the internal electrodes, leading to deterioration in characteristics and reliability. For the above reasons, it is desirable in terms of design to match the sinterability in the lowest possible temperature range. On the other hand, when trying to match the sinterability, there is a possibility that the appropriate firing temperature range may be narrowed. An object of the present invention is to provide an all solid battery and a method for manufacturing the same that can improve the co-sinterability of the solid electrolyte layer and the internal electrodes while ensuring an appropriate firing temperature range.

Means for Solving the Problems

An all solid battery of the present invention is characterized by including: a solid electrolyte layer of which a main component is an oxide-based solid electrolyte having a NASICON type crystal structure which has a compositional formula of $Li_{1+x+2y+a}A_yM'_xM''_{2-x-y}P_3O_{12+c}$, in which "A" is a divalent metal element, "M'" is a trivalent metal element, "M''" is a quadrivalent transition metal, and satisfies $0<a<1.4$; a first internal electrode which is provided on a first main face of the solid electrolyte layer and includes an electrode active material; and a second internal electrode which is provided on a second main face of the solid electrolyte layer and includes an electrode active material.

In the above-mentioned all solid battery, "x" may be 0 or more and 0.7 or less in the compositional formula.

In the above-mentioned all solid battery, "y" may be 0 or more and 0.3 or less in the compositional formula.

In the above-mentioned all solid battery, "A" may include at least one of Ni, Mg, Ca and Ba in the compositional formula.

In the above-mentioned all solid battery, "M'" in the compositional formula may include at least one of Al, Y, Ga and La.

In the above-mentioned all solid battery, "M''" in the compositional formula may include at least one of Ge and Zr.

A manufacturing method of an all solid battery of the present invention includes: preparing a multilayer structure having a green sheet, an applied paste for first electrode layer provided on a first main face of the green sheet and including an electrode active material, an applied paste for second electrode layer provided on a second main face of the green sheet and including an electrode active material; and firing the multilayer structure, wherein the green sheet includes oxide-based solid electrolyte powder having a NASICON type crystal structure which has a compositional formula of $Li_{1+x+2y+a}A_yM'_xM''_{2-x-y}P_3O_{12+c}$, in which "A" is a divalent metal element, "M'" is a trivalent metal element, "M''" is a quadrivalent transition metal, and satisfies $0<a<1.4$.

Effects of the Invention

According to the present invention, it is possible to provide an all solid battery and a manufacturing method of the all solid battery that are capable of improving the co-sinterability of the solid electrolyte layer and the internal electrodes while ensuring an appropriate firing temperature range.

BEST MODES FOR CARRYING OUT THE INVENTION

A description will be given of an embodiment with reference to the accompanying drawings.

Figure 1:
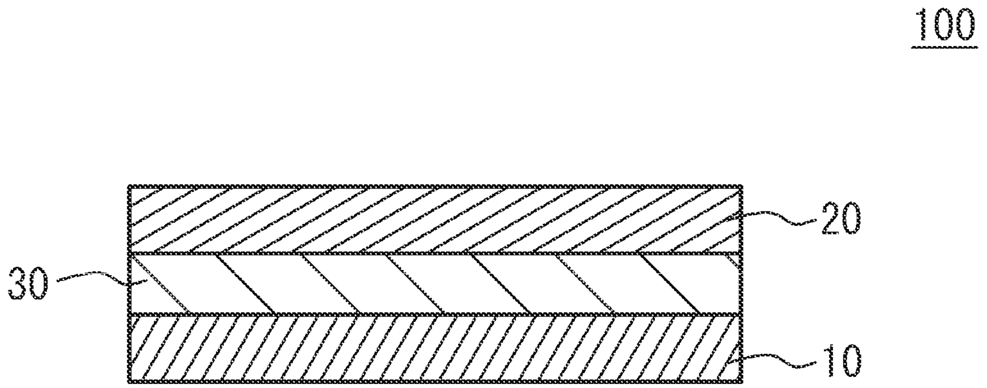
FIG. 1 is a schematic cross-sectional view illustrating a basic structure of an all solid battery.

(First embodiment) FIG. 1 illustrates a schematic cross section of a basic structure of an all solid battery 100. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The second internal electrode 20 is provided on a second main face of the solid electrolyte layer 30.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is an oxide-based solid electrolyte having NASICON crystal structure and having ionic conductivity. For example, the solid electrolyte of the solid electrolyte layer 30 is an oxide-based solid electrolyte having lithium ion conductivity. The solid electrolyte is, for example, a phosphoric acid salt-based solid electrolyte. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first internal electrode 10 and the second internal electrode 20 is added in advance, is used. For example, when the first internal electrode 10 and the second internal electrode 20 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte. When the first internal electrode 10 and the second internal electrode 20 include phosphoric acid salt including Li and a transition metal other than Co, it is preferable that the solid electrolyte layer 30 includes Li—Al—Ge—$PO_4$-based material in which the transition metal is added in advance.

The first internal electrode 10 used as a positive electrode includes a material having an olivine type crystal structure, as an electrode active material. It is preferable that the second internal electrode 20 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first internal electrode 10 acting as a positive electrode. For example, when only the first internal electrode 10 includes the electrode active material having the olivine type crystal structure, the electrode active material acts as the positive electrode active material. When the second internal electrode 20 also includes an electrode active material having the olivine type crystal structure, discharge capacity may increase and an operation voltage may increase because of electric discharge, in the second internal electrode 20 acting as a negative electrode. The function mechanism is not completely clear. However, the mechanism may be caused by partial solid-phase formation together with the negative electrode active material.

When both the first internal electrode 10 and the second internal electrode 20 include an electrode active material having the olivine type crystal structure, the electrode active material of each of the first internal electrode 10 and the second internal electrode 20 may have a common transition metal. Alternatively, the transition metal of the electrode active material of the first internal electrode 10 may be different from that of the second internal electrode 20. The first internal electrode 10 and the second internal electrode 20 may have only single type of transition metal. The first internal electrode 10 and the second internal electrode 20 may have two or more types of transition metal. It is preferable that the first internal electrode 10 and the second internal electrode 20 have a common transition metal. It is more preferable that the electrode active materials of the both electrode layers have the same chemical composition. When the first internal electrode 10 and the second internal electrode 20 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode 20 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode 20. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode 10 and the second internal electrode 20, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. In the embodiment, a carbon material is used as the conductive auxiliary agent. A metal material may be used as the auxiliary agent, in addition to the carbon material. Pd, Ni, Cu, or Fe, or an alloy thereof may be used as the metal material of the conductive auxiliary agent. For example, the electrolyte of the first internal electrode 10 and the second internal electrode 20 may be the same as the main component solid electrolyte of the solid electrolyte layer 30.

Figure 2:
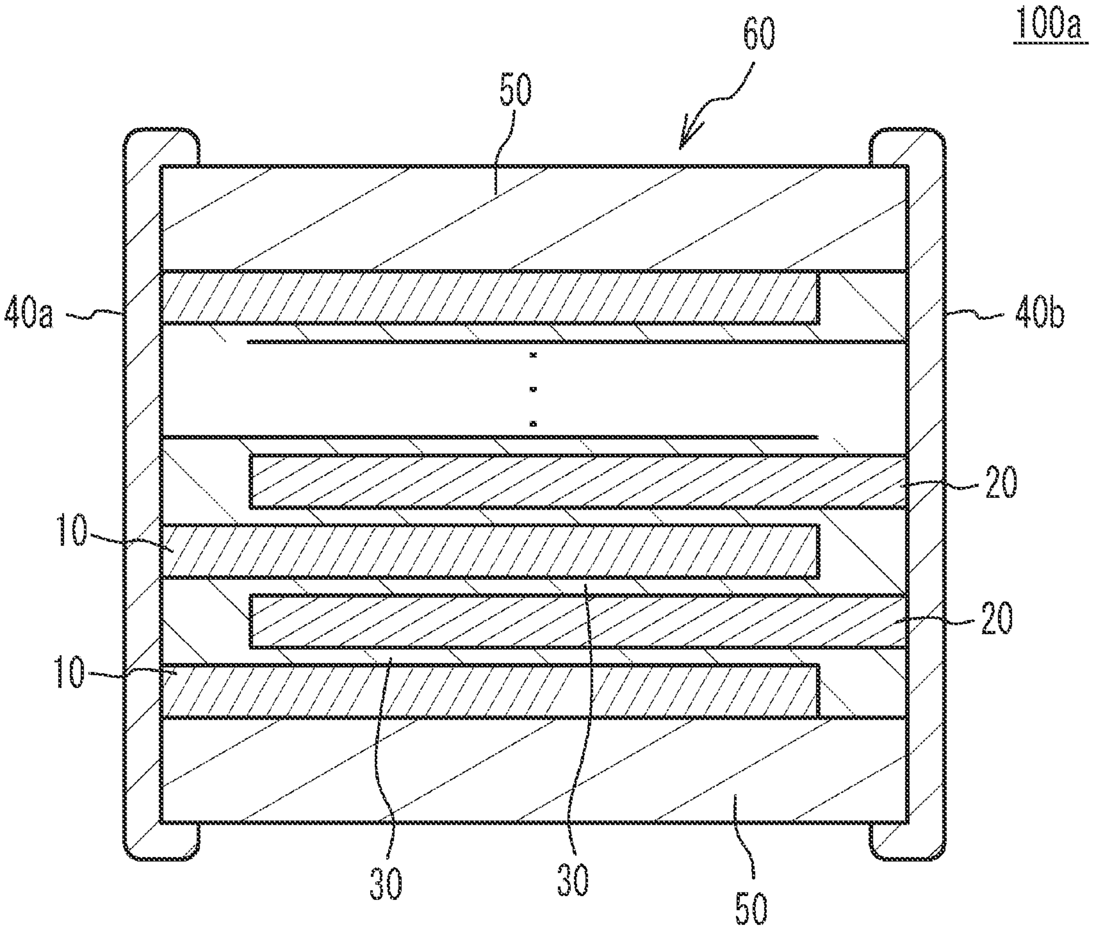
FIG. 2 illustrates a schematic cross section of a stack-type all solid battery.

FIG. 2 illustrates a schematic cross section of an all solid battery 100*a* in which a plurality of cell units are stacked. The all solid battery 100*a* has a multilayer chip 60 having a rectangular parallelepiped shape. Each of a first external electrode 40*a* and a second external electrode 40*b* is provided directly on each of two side faces among four side faces which are other than an upper face and a lower face of the multilayer chip 60 in the stacking direction. The two side faces may be adjacent to each other. Alternatively, the two side faces may be face with each other. In the embodiment, the first external electrode 40*a* and the second external electrode 40*b* are provided so as to contact two side faces facing each other (hereinafter referred to as two edge faces).

In the following description, the same numeral is added to each member that has the same composition range, the same thickness range and the same particle distribution range as that of the all solid battery 100. And, a detail explanation of the same member is omitted.

In the all solid battery 100*a*, each of the first internal electrodes 10 and each of the second internal electrodes 20 sandwich each of the solid electrolyte layer 30 and are alternately stacked. Edges of the first internal electrodes 10 are exposed to the first edge face of the multilayer chip 60 but are not exposed to the second edge face of the multilayer chip 60. Edges of the second internal electrodes 20 are exposed to the second edge face of the multilayer chip 60 but are not exposed to the first edge face. Thus, each of the first internal electrodes 10 and each of the second internal electrodes are alternately conducted to the first external electrode 40*a* and the second external electrode 40*b*. The solid electrolyte layer 30 extends from the first external electrode to the second external electrode 40*b*. In this way, the all solid battery 100*a* has a structure in which a plurality of cell units are stacked.

A cover layer 50 is stacked on an upper face (in FIG. 2 on the upper face of the uppermost internal electrode) of a stacked structure of the first internal electrode 10, the solid electrolyte layer 30 and the second internal electrode 20. Another cover layer is stacked on a lower face (in FIG. 8, on the lower face of the lowermost internal electrode) of the stacked structure. A main component of the cover layer 50 is an inorganic material such as Al, Zr, Ti (for example, $Al_2O_3$, $ZrO_2$, $TiO_2$ or the like). The main component of the cover layer 50 may be the main component of the solid electrolyte layer 30.

Figure 3:
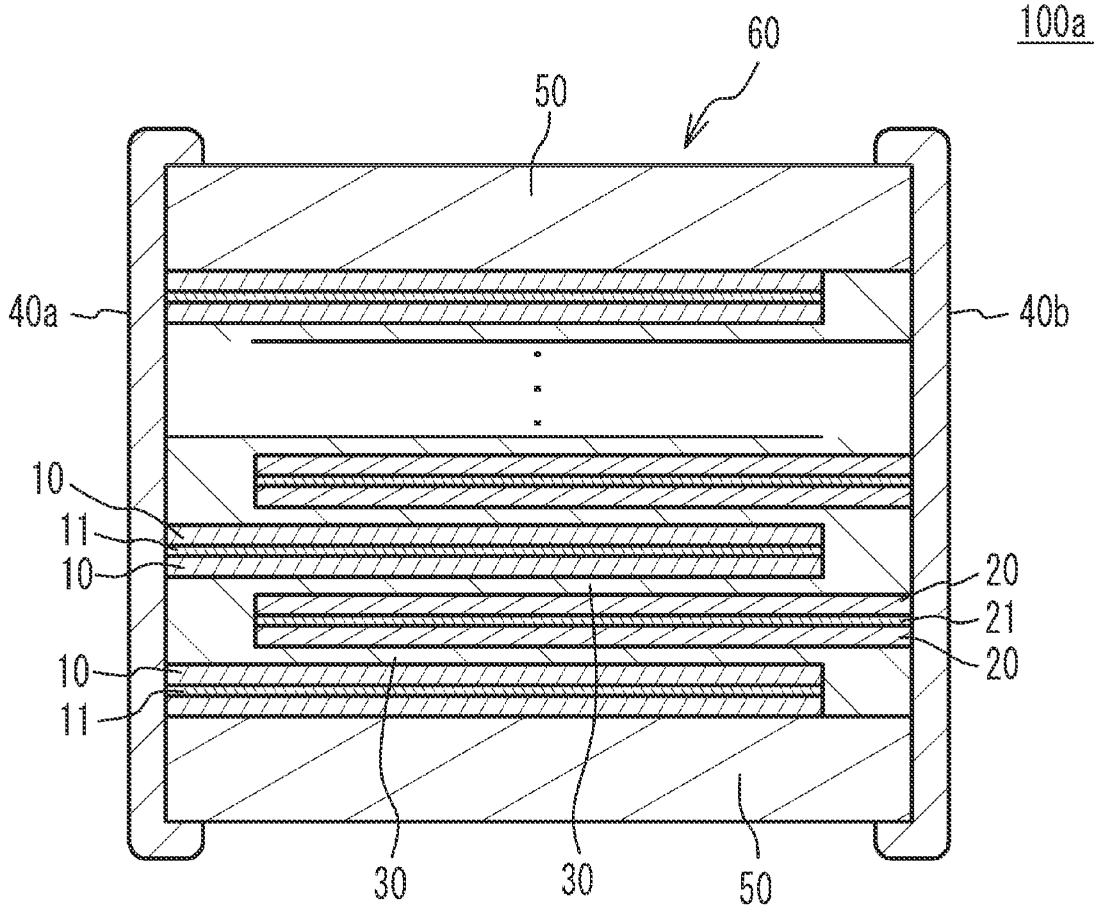
FIG. 3 illustrates another example of a stack-type all solid battery.

The first internal electrode 10 and the second internal electrode 20 may have an electric collector layer. For example, as illustrated in FIG. 3 a first electric collector layer 11 may be provided in the first internal electrode 10. A second electric collector layer 21 may be provided in the second internal electrode 20. A main component of the first electric collector layer 11 and the second electric collector layer 21 is a conductive material. For example, the conductive material of the first electric collector layer 11 and the second electric collector layer 21 may be such as a metal, carbon or the like. When the first electric collector layer 11 is connected to the first external electrode 40*a* and the second electric collector layer 21 is connected to the second external electrode 40*b*, current collecting efficiency is improved.

The solid electrolyte layer 30 whose main component is an oxide-based solid electrolyte having a NASICON-type crystal structure is formed by, for example, a sintering process in order to obtain desired characteristics. Since the solid electrolyte layer 30 and the first internal electrode 10 and the second internal electrode 20 need to be co-fired, cracks and delamination are likely to occur if there is a deviation in the sintering behavior between the members. In addition, due to the mutual diffusion reaction during co-firing, segregation of some substances and imbalance in density between the solid electrolyte layer 30, and the first internal electrode 10 and the second internal electrode 20 occur, which becomes more pronounced as the firing temperature increases. For example, when an electrode active material having an olivine-type crystal structure and an element contained in the electrode active material diffuse or segregate in the solid electrolyte layer 30, the segregated portion will act and cause a leak path. In addition, the formation of sparse portions due to sinterability deviation or reaction between members hinders the formation of ionic conduction paths in the relevant portions and electronic conduction paths in the internal electrodes, leading to deterioration of characteristics and reliability. Therefore, it is desirable to match the sinterability between the solid electrolyte layer 30, and the first internal electrode 10 and the second internal electrode 20 in the low temperature range. On the other hand, when trying to match the sinterability, there is a possibility that the appropriate firing temperature range will be narrowed.

Therefore, in the present embodiment, the oxide-based solid electrolyte having the NASICON-type crystal structure, which is the main component of the solid electrolyte layer 30, contains Li in excess with respect to the stoichiometric composition. Since Li has the effect of lowering the sintering start temperature, the sintering start temperature of the solid electrolyte layer 30 can be lowered as compared with the case of using an oxide-based solid electrolyte having a stoichiometric composition. Thereby, co-sinterability can be improved between the solid electrolyte layer 30, and the first internal electrode 10 and the second internal electrode 20. In the present embodiment, "improved co-sinterability" is defined as "when the solid electrolyte layer 30 and the first internal electrode 10 and the second internal electrode are co-fired, the porosity of both can be reduced."

On the other hand, when the amount of the added Li is too large, the sintering temperature of the solid electrolyte layer 30 is too low due to material design, and defects such as cracks and interlayer delamination tend to occur due to differences in shrinkage. In addition, the co-firing temperature range in which the solid electrolyte layer 30 and the first internal electrode 10 and the second internal electrode can be co-sintered is very narrow, making it difficult to apply the method from the viewpoint of productivity in the firing process. The co-firing temperature range is the maximum temperature range maintained in the firing process.

As a result of intensive research by the present inventors, the oxide-based solid electrolyte having the NASICON-type crystal structure has a solid electrolyte layer where 0<a<1.4 when represented by the following formula (1). In this case, it has been found that the co-sinterability of the solid electrolyte layer 30 and the first internal electrode 10 and the second internal electrode 20 is improved without narrowing the appropriate firing temperature range of the solid electrolyte layer 30. In addition, in the following formula (1), "A" is a divalent metal element. "M'" is a trivalent metal element. "M"" is a tetravalent transition metal.

$$Li_{1+x+2y+a}A_yM'_xM''_{2-x-y}P_3O_{12+c} \quad (1)$$

From the viewpoint of sufficiently lowering the sintering start temperature of the oxide-based solid electrolyte having the NASICON-type crystal structure, "a" in the above formula (1) is preferably 0.1 or more, and more preferably 0.3 or more. From the viewpoint of sufficiently widening the firing temperature range suitable for densification of the solid electrolyte layer 30, "a" in the above formula (1) is preferably 1.3 or less, more preferably 1.0 or less.

In the above formula (1), when "x" is large, the element M" that contributes to the formation of the basic skeleton of the NAS ICON crystal structure is reduced, so that unexpected by-products that inhibit the conduction path of Li ions are generated. As a result, the battery characteristics may deteriorate. Therefore, it is preferable to set an upper limit for "x". In the present embodiment, for example, "x" is preferably 0.7 or less, more preferably 0.6 or less, and even more preferably 0.5 or less.

In the above formula (1), when "x" is small, the number of Li ions that contribute as carriers in the solid electrolyte is reduced, which may reduce the ionic conductivity and lead to deterioration of battery characteristics. Therefore, it is preferable to set a lower limit on "x". In this embodiment, for example, "x" is preferably or more, more preferably 0.1 or more, and even more preferably 0.2 or more.

In the above formula (1), when "y" is large, the element M" that contributes to the formation of the basic skeleton of the NASICON crystal structure is reduced, so that unexpected by-products that inhibit the conduction path of Li ions are generated. As a result, the battery characteristics may deteriorate. Therefore, it is preferable to set an upper limit for "y". In the present embodiment, for example, "y" is preferably 0.3 or less, more preferably 0.25 or less, and even more preferably 0.2 or less.

In the above formula (1), when "y" is small, the number of Li ions that contribute as carriers in the solid electrolyte is reduced, so that the ionic conductivity may decrease and the battery characteristics may deteriorate. Therefore, it is preferable to set a lower limit for "y". In this embodiment, for example, "y" is preferably or more, more preferably 0.05 or more, and even more preferably 0.1 or more.

"A" in the above formula (1) is preferably a divalent element such as Ni, Mg, Ca, and Ba that can be partially substituted at the tetravalent sites of M". The different valence element substitution can increase the content of Li ions in the solid electrolyte. Similarly, "M'" is a trivalent element that can be partially substituted at the site of M", and is therefore preferably Al, Y, Ga, La, or the like. "M"" is preferably a known element such as Ge or Zr that can form a stable phosphate-based NAS ICON skeleton.

The thickness of the first internal electrode 10 and the second internal electrode 20 is 0.1 μm or more and 500 μm or less, 0.5 μm or more and 300 μm or less, or 1 μm or more and 300 μm or less. The thickness of the solid electrolyte layer 30 in the region sandwiched between the first internal electrode 10 and the second internal electrode 20 is 0.1 μm or more and 100 μm or less, 0.5 μm or more and 50 μm or less, or 1 μm or more and 20 μm or less.

Figure 4:
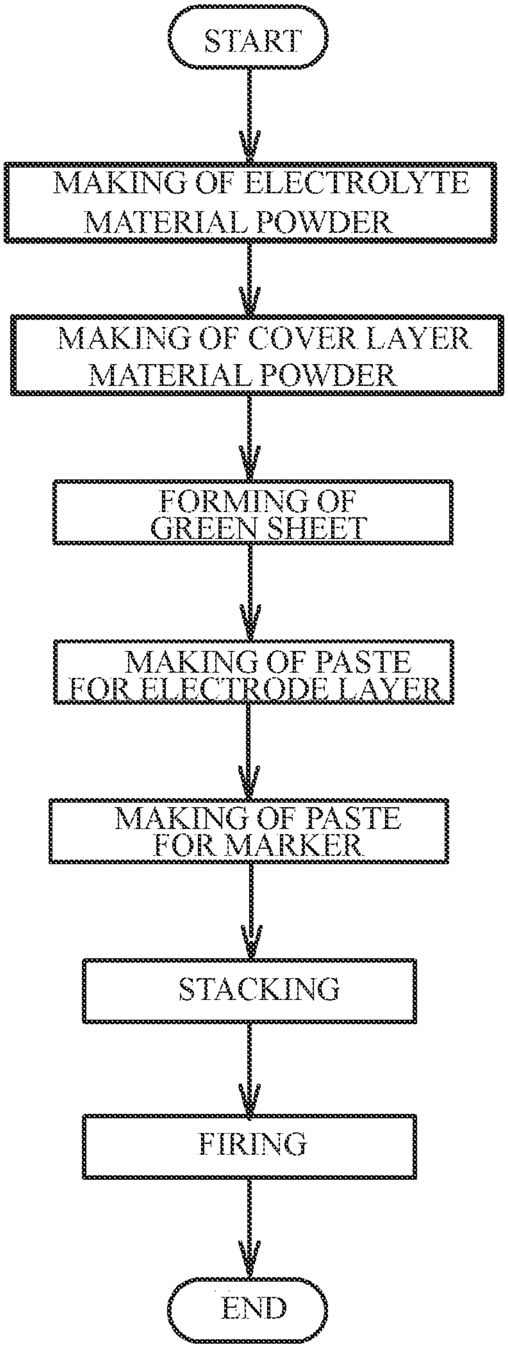
FIG. 4 illustrates a flowchart of a manufacturing method of an all solid battery; and FIG. 5A

A description will be given of a manufacturing method of the all solid battery 100*a* illustrated in FIG. 2. FIG. 4 illustrates a flowchart of the manufacturing method of the all solid battery 100*a*.

(Making process of raw material powder for solid electrolyte layer) First, raw material powder for the solid electrolyte layer that constitutes the solid electrolyte layer 30 described above is prepared. For example, by mixing raw materials, additives and so on and using a solid-phase synthesis method or the like, a raw material powder of an oxide-based solid electrolyte having a crystal structure that satisfies 0<a<1.4 in the above formula (1) can be made. By dry pulverizing the obtained raw material powder, it is possible to adjust to a desired average particle size. For example, a planetary ball mill using $ZrO_2$ balls of 5 mmφ is used to adjust the desired average particle size.

(Making process of raw material powder for cover layer) First, a ceramic raw material powder that constitutes the cover layer 50 described above is prepared. For example, raw material powder for the cover layer can be made by mixing raw materials, additives and so on and using a solid-phase synthesis method or the like. By dry pulverizing the obtained raw material powder, it is possible to adjust to a desired average particle size. For example, a planetary ball mill using $ZrO_2$ balls of 5 mmφ is used to adjust the desired average particle size. When the solid electrolyte layer 30 and the cover layer 50 have the same composition, the raw material powder for the solid electrolyte layer can be used.

(Making process for internal electrode) Next, an internal electrode paste for forming the above-described first internal electrode 10 and second internal electrode 20 is made. For example, an internal electrode paste can be obtained by uniformly dispersing a conductive aid, an electrode active material, a solid electrolyte material, a sintering aid, a binder, a plasticizer, and so on in water or an organic solvent. As the solid electrolyte material, the solid electrolyte paste described above may be used. A carbon material or the like is used as the conductive aid. A metal may be used as the conductive aid. Examples of the metal of the conductive aid include Pd, Ni, Cu, Fe, and alloys containing these. Pd, Ni, Cu, Fe, alloys containing these, and various carbon materials may also be used. When the compositions of the first internal electrode 10 and the second internal electrode 20 are different from each other, the respective internal electrode pastes may be prepared separately.

As the sintering aid, for example, any glass component such as Li—B—O based compounds, Li—Si—O based compounds, Li—C—O based compounds, Li—S—O based compounds, and Li—P—O based compounds can be used.

(External electrode paste preparation process) Next, an external electrode paste for forming the first external electrode 40*a* and the second external electrode 40*b* is made. For example, an external electrode paste can be obtained by uniformly dispersing a conductive material, a glass frit, a binder, a plasticizer, and the like in water or an organic solvent.

(Forming process of green sheet) A solid electrolyte slurry having a desired average particle size is prepared by uniformly dispersing the raw material powder for the solid electrolyte layer in an aqueous solvent or an organic solvent together with a binder, a dispersant, a plasticizer, and so on followed by wet pulverization. At this time, a bead mill, a wet jet mill, various kneaders, a high-pressure homogenizer, or the like can be used. And it is preferable to use a bead mill from the viewpoint of being able to simultaneously adjust the particle size distribution and disperse. A binder is added to the obtained solid electrolyte slurry to obtain a solid electrolyte paste. By applying the obtained solid electrolyte paste, the solid electrolyte green sheet 51 can be formed. The applying method is not particularly limited. A slot die method, a reverse coating method, a gravure coating method, a bar coating method, a doctor blade method, or the like can be used. The particle size distribution after wet pulverization can be measured, for example, using a laser diffraction measurement device using a laser diffraction scattering method.

Figure 5A:
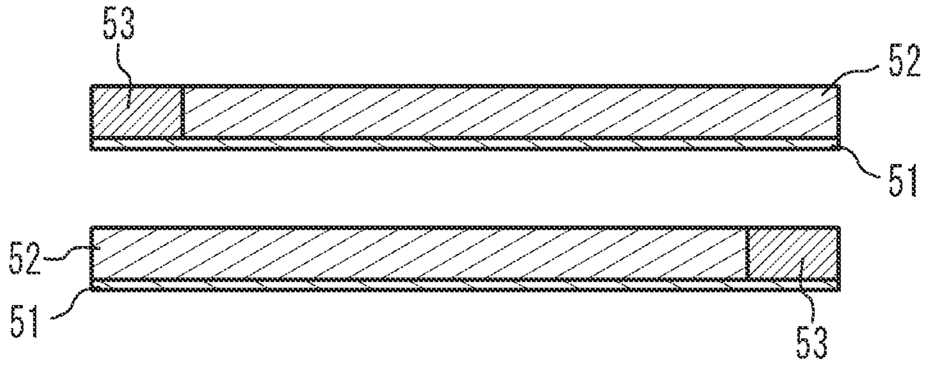
FIG. 5B illustrates a stacking process.
Figure 5B:
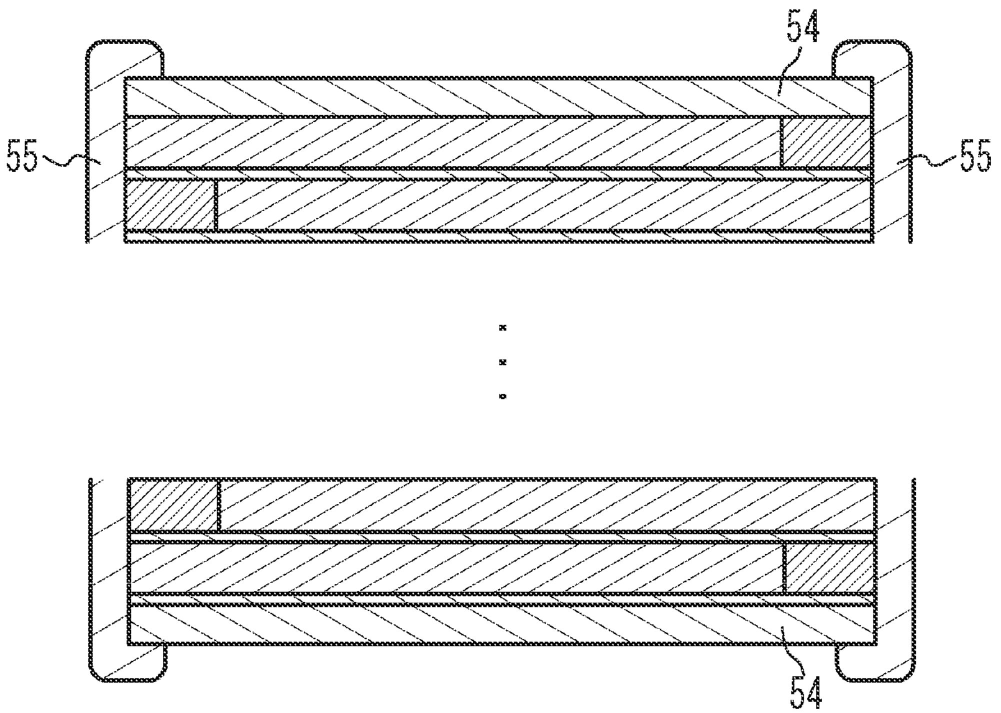

(Stacking process) Paste 52 for internal electrode is printed on one face of the solid electrolyte green sheet 51, as illustrated in FIG. 5A. A thickness of the paste 52 for internal electrode is equal to or more than a thickness of the solid electrolyte green sheet 51. A reverse pattern 53 is printed on a part of the solid electrolyte green sheet 51 where the paste 52 for electrode layer is not printed. A material of the reverse pattern 53 may be the same as that of the solid electrolyte green sheet 51. The solid electrolyte green sheets 51 after printing are stacked so that each of the solid electrolyte green sheets 51 is alternately shifted to each other. As illustrated in FIG. 5B, cover sheets 54 are clamped from an upper side and a lower side of the stacking direction. Thus, a multilayer structure is obtained. In this case, in the multilayer structure, each of the paste 52 for internal electrode is alternately exposed to the two end faces. The cover sheet 54 is formed by printing the material powder for cover layer with the same method as the forming of the solid electrolyte green sheet. The thickness of the cover sheet 54 is larger than the thickness of the solid electrolyte green sheet 51. The cover sheet 54 may be thickened during printing of the cover sheet 54. The cover sheet 54 may be thickened by stacking t plurality of the printed sheets.

Next, the two end faces are coated with paste 55 for external electrode by dipping method or the like. After that, the paste 55 for external electrode is dried. Thus, a compact for forming the all solid battery 100*a* is obtained.

(Firing process) Next, the obtained multilayer structure is fired. The firing conditions are oxidizing atmosphere or non-oxidizing atmosphere, and the maximum temperature is preferably 400° C. to 1000° C., more preferably 500° C. to 900° C., without any particular limitation. A step of holding below the maximum temperature in an oxidizing atmosphere may be provided to sufficiently remove the binder until the maximum temperature is reached. In order to reduce process costs, it is desirable to perform the firing at as low a temperature as possible. After firing, re-oxidation process may be performed. Through the above steps, the all solid battery 100*a* is produced.

The internal electrode paste, a current collector paste containing the conductive material, and the internal electrode paste may be sequentially stacked to form current collector layers in the first internal electrode 10 and the second internal electrode 20.

EXAMPLES

All solid batteries were produced according to the embodiments, and their characteristics were investigated.

(Example 1) A sintering aid was added to a phosphate-based solid electrolyte having a predetermined particle size and dispersed in a dispersion medium to prepare a solid electrolyte slurry. A solid electrolyte paste was prepared by adding a binder to the obtained solid electrolyte slurry. A green sheet was formed by applying the solid electrolyte paste. $Li_{1.7}Mg_{0.05}Al_{0.3}Ge_{1.65}P_3O_{12+c}$ was used as the phosphate-based solid electrolyte. Expressed as $Li_{1+x+2y+a}A_yM'_xM''_{2-x-y}P_3O_{12+c}$, "a" is 0.3, "x" is 0.3, and "y" is 0.05.

The electrode active material and the solid electrolyte material were highly dispersed using a wet bead mill or the like to prepare a ceramic paste consisting only of ceramic particles. Next, the ceramic paste and the conductive material were thoroughly mixed to prepare an internal electrode paste.

The internal electrode paste was printed on the solid electrolyte green sheet using a screen with a predetermined pattern. 100 printed sheets were stacked so that the electrodes were alternately pulled out to the left and right.

A sintering aid was added to a phosphate-based solid electrolyte having a predetermined particle size and dispersed in a dispersion medium to prepare a solid electrolyte slurry. A cover sheet paste was prepared by adding a binder to the obtained solid electrolyte slurry. A cover sheet was formed by applying the cover sheet paste.

Each stack of the solid electrolyte green sheets was attached to the upper and lower sides as a cover layer, and was crimped by a hot press, and the resulting stack was cut to a predetermined size with a dicer. Thereby, a substantially rectangular parallelepiped multilayer structure was obtained. In the multilayer structure, the external electrode paste was applied to each of the two end faces where the internal electrode paste was exposed, by a dipping method or the like, and then dried. After that, heat treatment was performed at 300° C. or higher and 500° C. or lower for removing the binder. Another heat treatment was performed in a temperature range of 500° C. or higher and 900° C. or lower to produce a sintered body.

(Example 2) The conditions were the same as in Example 1, except that $Li_{1.7}Mg_{0.1}Al_{0.3}Ge_{1.6}P_3O_{12+c}$ was used as the phosphate-based solid electrolyte. Expressed as $Li_{1+x+2y+a}A_yM'_xM''_{2-x-y}P_3O_{12+c}$, "a" is 0.2, "x" is 0.3, and "y" is 0.1.

(Example 3) The conditions were the same as in Example 1, except that $Li_{1.44}Mg_{0.02}Al_{0.3}Ge_{1.68}P_3O_{12+c}$ was used as the phosphate-based solid electrolyte. Expressed as $Li_{1+x+2y+a}A_yM'_xM''_{2-x-y}P_3O_{12+c}$, "a" is 0.1, "x" is 0.3, and "y" is 0.02.

(Example 4) The conditions were the same as in Example 1, except that $Li_{1.7}Ba_{0.05}Al_{0.3}Ge_{1.65}P_3O_{12+c}$ was used as the phosphate-based solid electrolyte. Expressed as $Li_{1+x+2y+a}A_yM'_xM''_{2-x-y}P_3O_{12+c}$, "a" is 0.3, "x" is 0.3, and "y" is 0.05.

(Example 5) The conditions were the same as in Example 1, except that $Li_{1.8}Mg_{0.05}Al_{0.5}Ge_{1.45}P_3O_{12+c}$ was used as the phosphate-based solid electrolyte. Expressed as $Li_{1+x+2y+a}A_yM'_xM''_{2-x-y}P_3O_{12+c}$, "a" is 0.2, "x" is 0.5, and "y" is 0.05.

(Example 6) The conditions were the same as in Example 1, except that $Li_{1.7}Mg_{0.05}Al_{0.5}Ge_{1.45}P_3O_{12+c}$ was used as the phosphate-based solid electrolyte. Expressed as $Li_{1+x+2y+a}A_yM'_xM''_{2-x-y}P_3O_{12+c}$, "a" is 0.1, "x" is 0.5, and "y" is 0.05.

(Example 7) The conditions were the same as in Example 1, except that $Li_{2.2}Mg_{0.05}Al_{0.8}Ge_{1.15}P_3O_{12+c}$ was used as the phosphate-based solid electrolyte. Expressed as $Li_{1+x+2y+a}A_yM'_xM''_{2-x-y}P_3O_{12+c}$, "a" is 0.3, "x" is 0.8, and "y" is 0.05.

(Example 8) The conditions were the same as in Example 1, except that $Li_{2.2}Mg_{0.4}Al_{0.3}Ge_{1.3}P_3O_{12+c}$ was used as the phosphate-based solid electrolyte. Expressed as $Li_{1+x+2y+a}A_yM'_xM''_{2-x-y}P_3O_{12+c}$, "a" is 0.1, "x" is 0.3, and "y" is 0.4.

(Comparative example 1) The conditions were the same as in Example 1, except that $Li_{1.3}Al_{0.3}Ge_{1.7}P_3O_{12+c}$ was used as the phosphate-based solid electrolyte. Expressed as $Li_{1+x+2y+a}A_yM'_xM''_{2-x-y}P_3O_{12+c}$, "a" is 0, "x" is 0.3, and "y" is 0.

(Comparative example 2) The conditions were the same as in Example 1, except that $Li_{1.1}Mg_{0.05}Al_{0.3}Ge_{1.65}P_3O_{12+c}$ was used as the phosphate-based solid electrolyte. Expressed as $Li_{1+x+2y+a}A_yM'_xM''_{2-x-y}P_3O_{12+c}$, "a" is −0.3, "x" is 0.3, and "y" is 0.05.

(Comparative Example 3) The conditions were the same as in Example 1, except that $Li_{2.8}Mg_{0.05}Al_{0.3}Ge_{1.65}P_3O_{12+c}$ was used as the phosphate-based solid electrolyte. Expressed as $Li_{1+x+2y+a}A_yM'_xM''_{2-x-y}P_3O_{12+c}$, "a" is 1.4, "x" is 0.3, and "y" is 0.05.

(Comparative Example 4) The conditions were the same as in Example 1, except that $Li_{1.5}Al_{0.5}Ge_{1.5}P_3O_{12+c}$ was used as the phosphate-based solid electrolyte. Expressed as $Li_{1+x+2y+a}A_yM'_xM''_{2-x-y}P_3O_{12+c}$, "a" is 0, "x" is 0.5, and "y" is 0.

Table 1 shows the compositions of the phosphate-based solid electrolytes used in Examples 1 to 8 and Comparative Examples 1 to 4.

TABLE 1

| | x | y | a | COMPOSITION OF SOLID ELECTROLYTE |
|---|---|---|---|---|
| EXAMPLE 1 | 0.3 | 0.05 | 0.3 | $Li_{1.7}Mg_{0.05}Al_{0.3}Ge_{1.65}P_3O_{12+c}$ |
| EXAMPLE 2 | 0.3 | 0.1 | 0.2 | $Li_{1.7}Mg_{0.1}Al_{0.3}Ge_{1.6}P_3O_{12+c}$ |
| EXAMPLE 3 | 0.3 | 0.02 | 0.1 | $Li_{1.44}Mg_{0.02}Al_{0.3}Ge_{1.68}P_3O_{12+c}$ |
| EXAMPLE 4 | 0.3 | 0.05 | 0.3 | $Li_{1.7}Ba_{0.05}Al_{0.3}Ge_{1.65}P_3O_{12+c}$ |
| EXAMPLE 5 | 0.5 | 0.05 | 0.2 | $Li_{1.8}Mg_{0.05}Al_{0.5}Ge_{1.45}P_3O_{12+c}$ |
| EXAMPLE 6 | 0.5 | 0.05 | 0.1 | $Li_{1.7}Mg_{0.05}Al_{0.5}Ge_{1.45}P_3O_{12+c}$ |
| EXAMPLE 7 | 0.8 | 0.05 | 0.3 | $Li_{2.2}Mg_{0.05}Al_{0.8}Ge_{1.15}P_3O_{12+c}$ |
| EXAMPLE 8 | 0.3 | 0.4 | 0.1 | $Li_{2.2}Mg_{0.4}Al_{0.3}Ge_{1.3}P_3O_{12+c}$ |
| COMPARATIVE EXAMPLE 1 | 0.3 | 0 | 0 | $Li_{1.3}Al_{0.3}Ge_{1.7}P_3O_{12}$ |
| COMPARATIVE EXAMPLE 2 | 0.3 | 0.05 | −0.3 | $Li_{1.1}Mg_{0.05}Al_{0.3}Ge_{1.65}P_3O_{12+c}$ |
| COMPARATIVE EXAMPLE 3 | 0.3 | 0.05 | 1.4 | $Li_{2.8}Mg_{0.05}Al_{0.3}Ge_{1.65}P_3O_{12+c}$ |
| COMPARATIVE EXAMPLE 4 | 0.5 | 0 | 0 | $Li_{1.5}Al_{0.5}Ge_{1.6}P_3O_{12}$ |

(Analysis of co-sinterability) The co-sinterability was examined for each of Examples 1 to 8 and Comparative Examples 1 to 4. Specifically, the porosity of the solid electrolyte layer 30 after firing was measured, and the overall porosity was measured and evaluated. The all solid battery obtained by alternately stacking the internal electrodes and the solid electrolyte layers was cross-sectioned with a cross-section polisher (CP), and the solid electrolyte layers and the internal electrodes were examined with a scanning electron microscope (Using Hitachi High-Tech Co., Ltd., model: S-4800), secondary electron images were obtained at 10 points at an accelerating voltage of 5 kV and the same magnification. By image analysis, the occupancy rate of the average pore area of each layer was measured, and the porosity of the solid electrolyte layer and the internal electrode was measured. The overall porosity was defined as the value of the porosity when the measured values of both layers were added up, and calculated.

If the overall porosity was less than 5%, the co-sinterability was judged as good "o". When the overall porosity was 5% or more and less than 10%, the co-sinterability was judged as somewhat good "Δ". When the overall porosity was 10% or more, the co-sinterability was judged as bad "x".

(Analysis of appropriate co-firing temperature range) For each of Examples 1 to 8 and Comparative Examples 1 to 4, the width of the appropriate co-firing temperature range was investigated. Specifically, the multilayer structure obtained by alternately stacking electrode layers and solid electrolyte layers after removing the binder was prepared, and the firing temperature was varied to obtain the best overall porosity. The firing temperature at which the best overall porosity was obtained was defined as a standard. The sintering temperature range in which the decrease in the overall porosity was 5% or less with respect to the standard was defined as an appropriate simultaneous sintering temperature range for evaluation.

When the width of the co-firing temperature range was ±10° C. or more, the co-firing temperature range was judged as good "o". When the width of the co-firing temperature range was ±5° C. or more and less than 10° C., the co-firing temperature range was judged as somewhat good "A". When the width of the co-firing temperature range was less than ±5° C., the co-firing temperature range was judged as bad "x".

(Analysis of battery characteristics) The battery characteristics were examined for each of Examples 1 to 8 and Comparative Examples 1 to 4. Specifically, the initial coulombic efficiency was measured, and the capacity retention rate after 100 cycles was measured. For the initial coulombic efficiency, a charge-discharge test was performed at room temperature. After charging to 2.7 V at a current density of 10 $\mu A/cm^2$, the battery was discharged to 0 V at the same current density with a rest period of 10 minutes. The initial charge capacity and discharge capacity were measured, and the value obtained by dividing the initial discharge capacity by the initial charge capacity was defined as the initial coulombic efficiency and evaluated. In addition, 100 cycles of measurement were performed under the same charge and discharge conditions, and the value obtained by dividing the discharge capacity after 100 cycles by the initial discharge capacity was defined as the capacity retention rate after 100 cycles, and judgment was made.

When the initial coulomb efficiency was 80% or higher, it was judged as very good "double circle". When the initial coulombic efficiency was 60% or more and less than 80%, it was judged as good "a". When the initial coulombic efficiency was 30% or more and less than 60%, it was judged as somewhat good "A". When the initial coulombic efficiency was less than 30%, it was judged as bad "x".

(Overall judgement) When the co-sinterability, co-firing temperature range, and battery characteristics were all judged as good "o" or very good "double circle", the overall judgment was judged as good "o". In the co-sinterability, the co-firing temperature range, and the battery characteristics, if there was no bad "x" and one or more somewhat good "A", the overall judgment was judged as somewhat good "A". When there was one or more bad "x" in the co-sinterability, co-firing temperature range, and battery specification, the overall judgment was judged as bad "x". Table 2 shows the results.

TABLE 2

| | POROSITY OF SOLID ELECTRO-LYTE | OVER-ALL POROS-ITY | CO-SITER-ABILITY | WIDTH OF FIRING TEMPER-ATURE | APPRO-PRIATE TEMPER-ATURE RANGE | INITIAL COULOMBIC EFFICIENCY | CAPACITY RETENTION RATE AFTER 100 CYCLES | CHARAC-TERISTIC | OVER-ALL |
|---|---|---|---|---|---|---|---|---|---|
| EXAMPLE 1 | 2.3% | 3.2% | ○ | ±10° C. | ○ | 84.2% | 80.3% | ◎ | ○ |
| EXAMPLE 2 | 4.0% | 4.3% | ○ | ±15° C. | ○ | 80.4% | 79.0% | ◎ | ○ |
| EXAMPLE 3 | 6.0% | 4.9% | ○ | ±20° C. | ○ | 66.3% | 68.3% | ○ | ○ |
| EXAMPLE 4 | 5.2% | 4.4% | ○ | ±20° C. | ○ | 71.2% | 70.1% | ○ | ○ |
| EXAMPLE 5 | 2.2% | 4.0% | ○ | ±10° C. | ○ | 76.1% | 75.8% | ○ | ○ |
| EXAMPLE 6 | 2.4% | 3.5% | ○ | ±10° C. | ○ | 78.3% | 77.0% | ○ | ○ |
| EXAMPLE 7 | 4.3% | 7.5% | Δ | ±5~10° C. | Δ | 56.1% | 60.9% | Δ | Δ |
| EXAMPLE 8 | 6.3% | 6.8% | Δ | ±5~10° C. | Δ | 32.5% | 36.7% | Δ | Δ |
| COMPARATIVE EXAMPLE 1 | 12.6% | 13.3% | X | ±20° C. | ○ | 53.3% | 54.7% | Δ | X |
| COMPARATIVE EXAMPLE 2 | 10.3% | 16.0% | X | ±40° C. | ○ | 16.0% | 20.6% | X | X |
| COMPARATIVE EXAMPLE 3 | 9.8% | 14.7% | X | LESS THAN ±5° C. | X | 50.8% | 49.0% | Δ | X |
| COMPARATIVE EXAMPLE 4 | 4.0% | 10.2% | X | ±10° C. | ○ | 42.6% | 22.3% | Δ | X |

In all of Examples 1 to 8, the co-sinterability was judged as good “o” or somewhat good “Δ”. It is considered that this was because $0<a<1.4$ was satisfied in the above formula (1) and Li was excessive with respect to the stoichiometric composition. Next, in all of Examples 1 to 8, the co-firing temperature range was judged as good “o” or somewhat good “Δ”. It is considered that this was because was satisfied in the above formula (1) and Li was not excessively large. In addition, in all of Examples 1 to 8, the battery characteristics were also judged as very good “double circle”, good “o” or somewhat good “Δ”. It is considered that this was because the co-sinterability was good “o” or somewhat good “Δ”.

In all of Comparative Examples 1, 2, and 4, the co-sinterability was judged as bad “x”. It is considered that this was because the relation of $0<a<1.4$ was not satisfied in the above formula (1), and the sintering start temperature of the solid electrolyte layer 30 was not lowered. As for Comparative Example 3, the co-firing temperature range was judged as bad “x”. It is considered that this was because was not satisfied in the above formula (1) and Li was excessively large.

The battery characteristics of Examples 1 to 6 were better than those of Examples 7 and 8. It is considered that this was because in Examples 1 to 6, $0<a<1.4$ and $0 \le x \le 0.7$ and $0 \le y \le 0.3$ were satisfied in the above formula (1).

Although the embodiments of the present invention have been described in detail, it is to be understood that the various change, substitutions, and alterations could be made hereto without departing from the spirit and scope of the invention.

What is claimed is:

1. An all solid battery comprising:

a solid electrolyte layer of which a main component is an oxide-based solid electrolyte having a NASICON type crystal structure which has a compositional formula of $Li_{1+x+2y+a}A_yM'_xM''_{2-x-y}P_3O_{12+c}$, in which “A” is a divalent metal element, “M'” is a trivalent metal element, “M''” is a quadrivalent transition metal, and satisfies $0<a<1.4$;

a first internal electrode which is provided on a first main face of the solid electrolyte layer and includes an electrode active material; and a second internal electrode which is provided on a second main face of the solid electrolyte layer and includes an electrode active material.

2. The all solid battery as claimed in claim 1, wherein “x” is 0 or more and 0.7 or less in the compositional formula.

3. The all solid battery as claimed in claim 1, wherein “y” is 0 or more and 0.3 or less in the compositional formula.

4. The all solid battery as claimed in claim 1, wherein “A” includes at least one of Ni, Mg, Ca and Ba in the compositional formula.

5. The all solid battery as claimed in claim 1, “M'” in the compositional formula includes at least one of Al, Y, Ga and La.

6. The all solid battery as claimed in claim 1, wherein “M''” in the compositional formula includes at least one of Ge and Zr.

7. A manufacturing method of an all solid battery, comprising:

preparing a multilayer structure having a green sheet, an applied paste for first electrode layer provided on a first main face of the green sheet and including an electrode active material, an applied paste for second electrode layer provided on a second main face of the green sheet and including an electrode active material; and firing the multilayer structure, wherein the green sheet includes oxide-based solid electrolyte powder having a NASICON type crystal structure which has a compositional formula of $Li_{1+x+2y+a}A_yM'M''_{2-x-y}P_3O_{12+c}$, in which “A” is a divalent metal element, “M'” is a trivalent metal element, “M''” is a quadrivalent transition metal, and satisfies $0<a<1.4$.

* * * * *